United States Patent [19]

Gillingham

[11] Patent Number: 4,622,996

[45] Date of Patent: Nov. 18, 1986

[54] ASPIRATOR FOR PULSE-JET AIR CLEANER

[75] Inventor: Gary R. Gillingham, Prior Lake, Minn.

[73] Assignee: Donaldson Company, Inc., Minneapolis, Minn.

[21] Appl. No.: 711,763

[22] Filed: Mar. 14, 1985

[51] Int. Cl.$^4$ ............................................. B01D 46/04
[52] U.S. Cl. .................................. 137/590; 137/204; 251/45; 15/405; 417/76
[58] Field of Search ...................... 137/590, 203, 204; 251/45; 15/405; 55/302, 431; 417/76, 87, 157, 160; 220/DIG. 6

[56] References Cited

U.S. PATENT DOCUMENTS

| | | | |
|---|---|---|---|
| 757,200 | 4/1904 | Kettle | 417/76 |
| 2,326,687 | 8/1943 | Sanford | 137/204 |
| 2,939,477 | 6/1960 | Kaldobsky | 137/204 |
| 3,254,805 | 6/1966 | Barger | 137/204 |
| 4,033,732 | 7/1977 | Axelsson et al. | 137/590 |
| 4,244,554 | 1/1981 | DiMauro et al. | 251/45 |
| 4,364,751 | 12/1982 | Copley | 55/302 |
| 4,449,644 | 5/1984 | Matson | 251/45 |

OTHER PUBLICATIONS

Baumeister, Theodore, Ed. and Lionel S. Marks, Ed.; Mechanical Engineers' Handbook, 3/1958, 3-59 to 3-65.

Gast Catalog No. 5-30, Mar. 1982.

*Primary Examiner*—Alan Cohan
*Assistant Examiner*—John A. Rivell
*Attorney, Agent, or Firm*—Merchant, Gould, Smith, Edell, Welter & Schmidt

[57] ABSTRACT

An improved pulse-jet air cleaner (10) includes an aspirator (32) with a tube (34) extending between a point in the tank (12) where moisture tends to collect, and a point in predetermined spaced relationship adjacent the tank outlet (20) where the airflow is of high velocity and low pressure upon actuation of the pulse valve (24) so that any moisture is automatically discharged through the valve and nozzle (26) on a substantially continuous basis without operator attention or interruption of operation of the air cleaner system.

5 Claims, 3 Drawing Figures

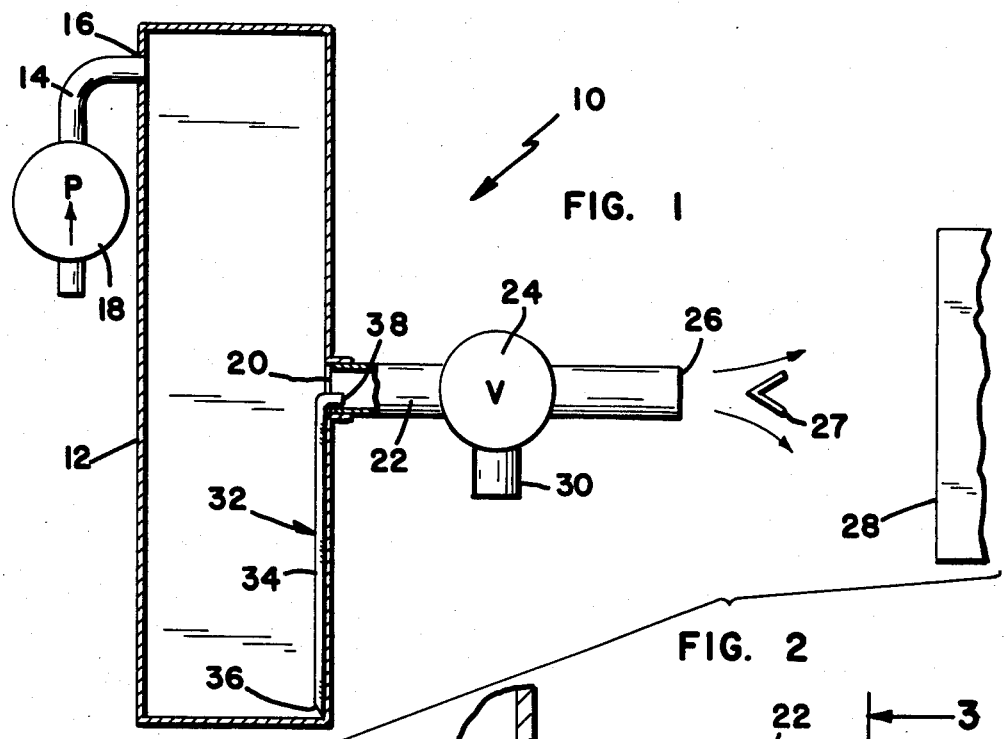
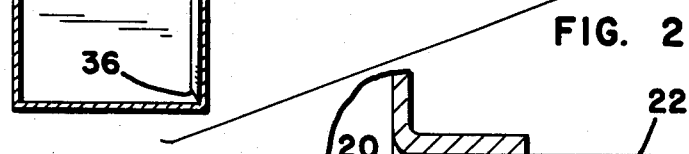
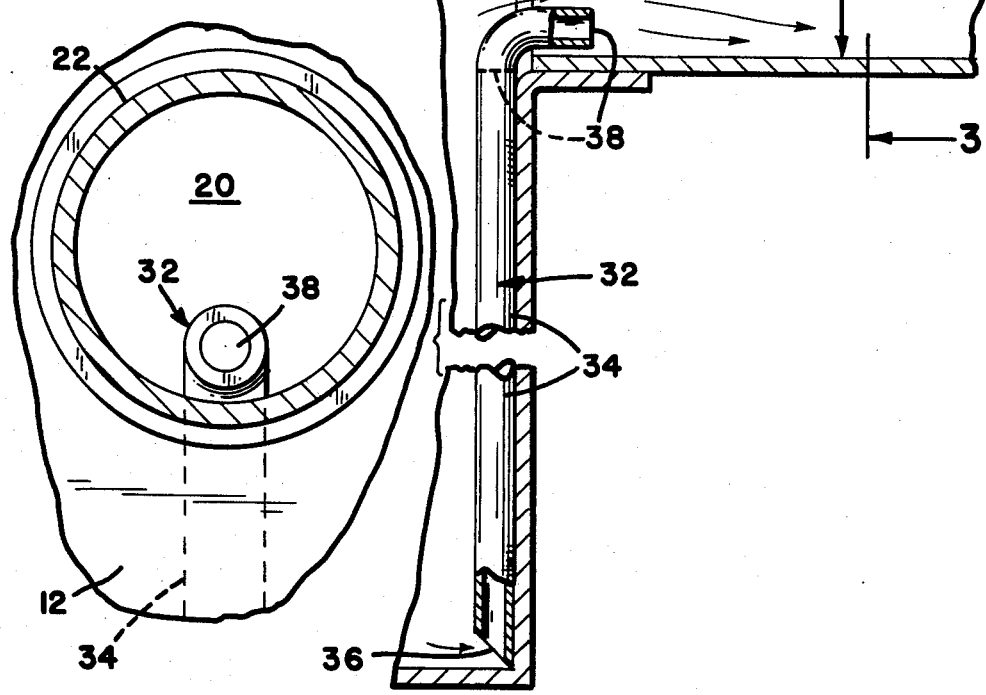

ASPIRATOR FOR PULSE-JET AIR CLEANER

TECHNICAL FIELD

The present invention relates generally to a device for removing condensate collected within a compressed gas tank. More particularly, this invention concerns a pulse-jet air cleaner for filters, incorporating an aspirator for automatically removing moisture from the compressed air tank upon actuation of the pulse valve.

BACKGROUND ART

The filters of air cleaners must be periodically replaced or cleaned to prevent undue buildup of dust and particulate matter which would adversely affect proper operation. Pulse-jet cleaners are typically used in installations requiring treatment of large volumes of air. Cleaning is accomplished by pulsing air through the filters in a direction opposite to the normal airflow direction to effect self-cleaning during operation of the system without removal and replacement of the filters. For example, U.S. Pat. No. 4,331,459 to Donaldson Company, the assignee hereof, shows a self-cleaning pulsed air cleaner which operates on this principle.

Such pulse-jet air cleaners usually include a reservoir or tank of compressed air which is connected by a diaphragm valve to a nozzle or orifice positioned to direct the air against the filter to effect cleaning. The diaphragm valve is controlled by a pilot valve. The air tank is charged with ambient air drawn from atmosphere by a compressor. However, the moisture content of the ambient air depends upon the season, temperature, etc. Therefore, as the air is pressurized and cooled, condensate or moisture tends to accumulate in the tank which can adversely affect operation of the pulse-jet air cleaner and lead to corrosion of the tanks.

The accumulation of moisture in the compressed air tanks of pulse-jet air cleaners has been a long-standing problem. Dryers are sometimes used to dry the incoming air. These are expensive, however, and require additional maintenance and space. More typically, some form of manual or automatic drain valve is incorporated into the tank. Such drain valves only operate intermittently and the intervals between operation necessary to minimize moisture accumulation in the tank vary depending upon the pressure, temperature and humidity of the ambient air. Thus, excessive amounts of moisture can accumulate in the tank when drain valves are used, causing reduced cleaning effectiveness or increased tank corrosion. Further, drain valves must remain open long enough for drainage of any moisture accumulation, which in turn also releases at least some pressure from the tank. A simple, staightforward means for removing moisture on a relatively continuous, automatic basis has not been available heretofore.

A need has thus arisen for an apparatus for automatically removing moisture accumulated inside compressed air tanks on a relatively continuous basis without manual interaction, or expensive modifications or additional components.

SUMMARY OF INVENTION

The present invention comprises an improved pulse-jet air cleaner incorporating an aspirator which overcomes the foregoing and other difficulties associated with the prior art. In accordance with the invention, there is provided an aspirator device which is particularly suited for use with the compressed air tank of a pulse-jet air cleaner, to remove any accumulated moisture from the tank on a relatively continuous, automatic basis upon each actuation of the pulse valve, although the invention can also be adapted for this purpose in other applications having tanks of compressed gas in which moisture tends to accumulate. The invention is relatively straightforward in that it comprises a tube or conduit extending between a point in the tank where any moisture would tend to accumulate, and a point adjacent the outlet where the velocity and pressure are such that the moisture is drawn out upon actuation of the pulse valve. In the preferred embodiment, the tube is located inside the tank, and the outlet end of the tube is positioned into the tank outlet a distance corresponding to about one-half (½) the internal diameter of the outlet.

BRIEF DESCRIPTION OF DRAWINGS

A better understanding of the invention can be had by reference to the following Detailed Description in conjunction with the accompanying Drawings, wherein:

FIG. 1 is a side view, partially in schematic, showing a portion of a pulse-jet air cleaner incorporating the invention;

FIG. 2 is an enlarged view of the junction between the outlet tube and the compressed air tank of FIG. 1; and FIG. 3 is an enlarged sectional view taken along lines 3—3 of FIG. 2 in the direction of the arrows.

DETAILED DESCRIPTION

Referring now to the Drawings, wherein like reference numerals designate like or corresponding elements throughout the views, and particularly referring to FIG. 1, there is shown a pulse-jet air cleaner 10 incorporating the aspirator of the invention. Although the aspirator is particularly adapted for use with compressed air tanks of pulse-jet air cleaners, it will be understood that the improvement of the invention can readily be adapted for use with other types of compressed gas tanks which are periodically partially discharged and in which it would be advantageous to remove any moisture accumulation therefrom on a relatively continuous basis without expensive additional components or modifications.

The pulse-jet air cleaner 10 includes a compressed air tank 12 which is charged with compressed air through an inlet pipe 14 connected to an inlet 16 by a compressor 18 which draws in ambient air from atmosphere. The tank includes an outlet 20 connected through a discharge pipe 22 to a pulse valve 24 and on to a nozzle or orifice 26 positioned and arranged to direct the pulses of air released from the tank across a diffuser 27 and against a filter 28 in a direction opposite to normal airflow through the filter so as to effect periodic partial cleaning by dislodging accumulated dust and particulate material from the filter. As illustrated, the discharge pipe 22 includes a single nozzle or orifice at its end, however, the pipe could include a number of orifices spaced along its length for discharge against multiple filters 28. An example of a self-cleaning pulsed air cleaner is shown in U.S. Pat. No. 4,331,459 issued to Donaldson Company, Inc., the assignee of the present invention, which disclosure is hereby incorporated by reference.

The pulse valve 24 is typically of the diaphragmtype controlled by a solenoid pilot valve 30 in order to release a pulse of air at high velocity and volume from the tank 12. For example, such pulse valves 24 and solenoid pilot valves 30 are commercially available from Goyen Controls Company of Sidney, Australia, or Automatic Switch Company of Florham Park, N.J. Except for the fact that a pulse of air of high velocity and volume is release from the tank 12 by the pulse valve 24, the particular type of pulse valve is not critical to practice of the invention.

The pulse-jet air cleaner 10 includes an aspirator 32 comprising the improvement of the invention. The aspirator 32 comprises a length of conduit or tubing 34 spot-welded or otherwise attached to the interior of tank 12 and having open opposite ends 36 and 38. The open inlet end 36 of the aspirator tube 34 is positioned on or at the bottom of the tank 12 where any moisture therein would tend to accumulate. The open outlet end 38 of the tube 34 is positioned adjacent the tank outlet 20 in the region of the vena contracta where there is maximum velocity and thus minimum pressure of fluid flow through the outlet.

The aspirator tube 32 as illustrated is lcoated inside the tank 12, however, it will be understood that the tube can also be located external to the tank and connected in proper relationship by means of ports (not shown).

Positioning of the open ends 36 and 38 of the aspirator tube 32 comprises a significant feature of the present invention. The open inlet end 36 is shown as being bevelled so that it can be positioned in close proximity with the bottom of the tank for moisture pickup. If desired, the open inlet end 36 can be turned like the outlet end 38 for purposes of moisture pickup.

Positioning of the open outlet end 38 at a predetermined point adjacent the tank outlet 20 is an important feature. When the pulse valve 24 releases compressed air from the tank, the velocity of the air increases as it exits the outlet 20 due to the reduction in cross-sectional flow area between the tank and discharge pipe 22. It is therefore desirable to locate the open discharge end 38 of the aspirator tube 34 at the point of highest velocity and lowest pressure adjacent to the tank outlet 20, preferably inside the discharge pipe 22, so that maximum suction is applied to the aspirator tube 34 to draw out any moisture collected in the tank 12 on a relatively continuous basis upon actuation of the pulse valve 24.

The exact positioning of the outlet end 38 of the aspirator tube 34 depends upon the configuration of the tank outlet 20. As illustrated, the outlet 20 has the characteristics of a sharp-edged orifice such that the outlet end 38 of the aspirator tube 34 is positioned inside the discharge pipe 22 a distance L equal to about one-half ($\frac{1}{2}$) the inside diameter D of the discharge pipe in the region of the vena contracta of flow through the tank outlet 20 and into the discharge pipe 22. For example, a metal conduit 34 of about one-quarter ($\frac{1}{4}$) inch outside diameter can be used with a discharge pipe 22 of about one (1) inch inside diameter D so that L would be about one-half ($\frac{1}{2}$) inch.

In some applications, it may not be necessary to position the outlet end 38 of the aspirator tube 34 inside the discharge pipe 22. For example, the outlet end 38 could terminate inside tank 12 but closely adjacent the tank outlet 20, as indicated in phantom lines in FIG. 2, if there is sufficient suction generated there upon actuation of valve 24 to draw moisture from the tank 12.

From the foregoing, it will thus be apparent that the present invention comprises an aspirator for a pulse-jet air cleaner having several advantages over the prior art.

By means of the present invention, any moisture accumulated in the compressed air tank is drawn out by suction automatically with each charge of air released by the pulse valve so that moisture removal is substantially continuous. Since moisture removal is substantially continuous, the amount of moisture released per pulse is minimal and has little or no effect on the overall operation of the cleaner. The aspirator herein is inexpensive, easy to install and requires no operator attention or moving parts. Other advantages will be evident to those skilled in the art.

Although particular embodiments of the invention have been described in the foregoing Detailed Description and illustrated in the accompanying Drawings, it will be understood that the invention is not limited only to the embodiment disclosed, but is intended to embrace any alternatives, equivalents, modifications and/or rearrangements of elements falling within the scope of the invention as defined by the following Claims.

What is claimed is:

1. In a pulse-jet air cleaner of the type including a compressed air tank with an outlet connected to a pulse valve, the improvement comprising:

an internal aspirator tube of smaller diameter than the tank outlet and having inlet and outlet ends, the inlet end of said tube terminating at a point in the tank where moisture tends to collect, and the outlet end of said tube terminating at a predetermined point relative to the tank outlet where the airflow upon actuation of the pulse valve is of high velocity and low pressure so that moisture collected within said tank will be drawn out on a substantially continuous basis upon each actuation of the pulse valve;

the inlet end of said tube being bevelled with a tip that engages a lower portion of the tank to facilitate moisture pickup.

2. The pulse-jet air cleaner of claim 1, wherein the outlet end of said aspirator tube extends into the discharge pipe and is positioned downstream from the tank outlet a distance substantially equal to one-half ($\frac{1}{2}$) the inside diameter of said discharge pipe.

3. A pulse-jet air cleaner for effecting periodic cleaning of a filter, comprising:

a tank having an inlet and an outlet;

means including a compressor connected to the inlet of said tank;

means defining a discharge opening positioned and arranged to discharge air against the filter in a direction opposite the direction of normal airflow through said filter;

a normally closed pulse valve connected between said discharge opening means and the outlet of said tank;

means connected to said pulse valve for selectively opening said pulse valve to discharge air from said tank through said discharge opening; and an internal aspirator tube having inlet and outlet ends, the inlet end of said tube terminating at a point in said tank where moisture tends to collect, and the outlet end of said tube terminating at a predetermined point relative to the tank outlet where airflow from said tank upon actuation of said pulse valve is of high velocity and low pressure so that moisture within said tank is discharged with each actuation of said pulse valve;

the inlet end of said tube being bevelled with a tip that engages a lower portion of the tank to facilitate moisture pickup.

4. The pulse-jet air cleaner of claim 3, wherein the outlet end of said aspirator tube is positioned inside said tank but closely adjacent the tank outlet.

5. The pulse-jet air cleaner of claim 3, wherein the outlet end of said aspirator tube extends into said discharge pipe and is positioned downstream from the tank outlet a distance substantially equal to one-half (½) the inside diameter of said discharge pipe.

* * * * *